April 16, 1935.  H. R. PRESCOTT  1,998,412
METHOD OF MAKING GEOLOGICAL EXPLORATIONS
Filed March 29, 1934   2 Sheets-Sheet 1
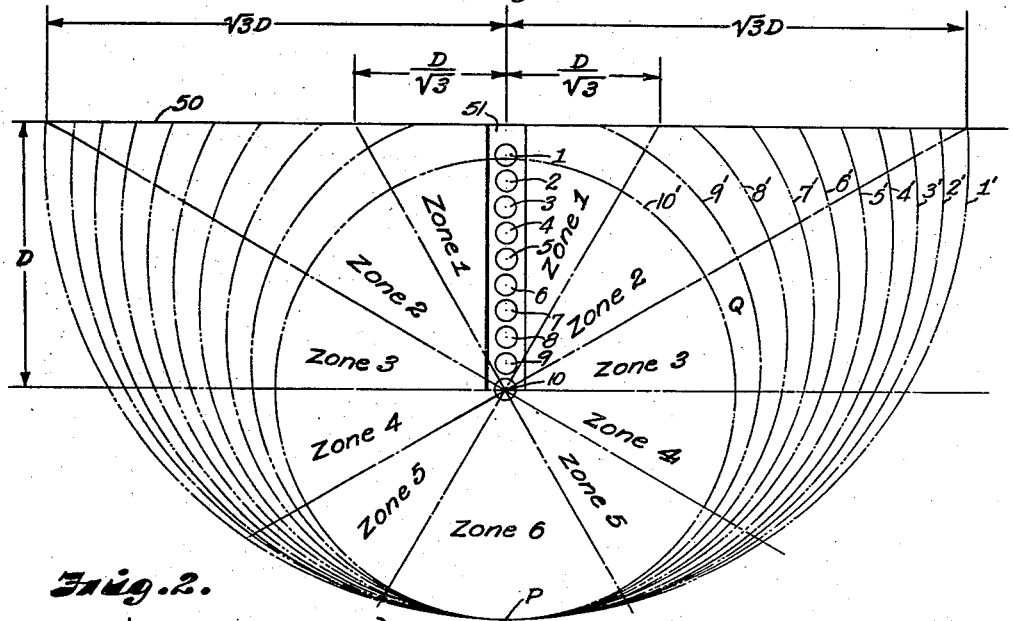
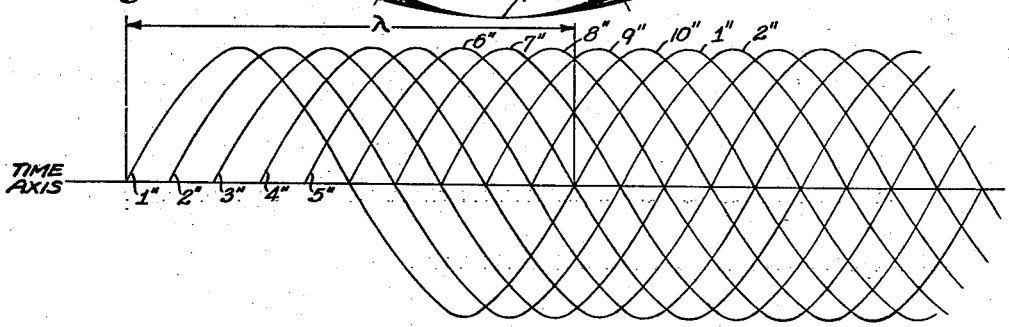
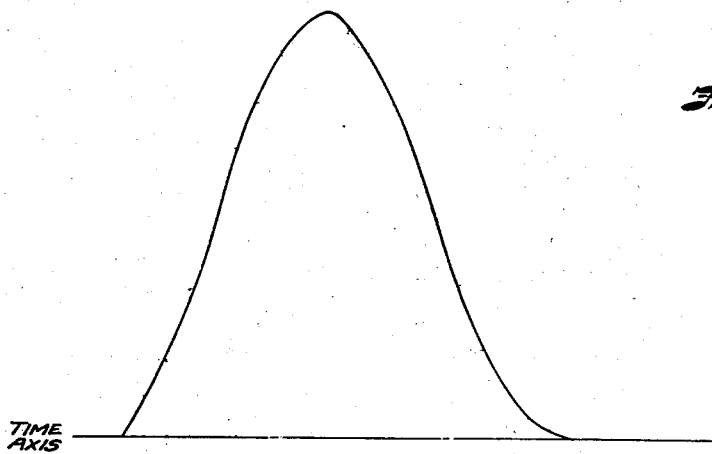
INVENTOR
Harold R. Prescott
BY
ATTORNEY April 16, 1935.  H. R. PRESCOTT  1,998,412
METHOD OF MAKING GEOLOGICAL EXPLORATIONS
Filed March 29, 1934   2 Sheets-Sheet 2

INVENTOR
Harold R. Prescott
BY
ATTORNEY

Patented Apr. 16, 1935

1,998,412

UNITED STATES PATENT OFFICE 1,998,412

METHOD OF MAKING GEOLOGICAL EXPLORATIONS

Harold R. Prescott, Ponca City, Okla., assignor to Continental Oil Company, Ponca City, Okla., a corporation of Delaware Application March 29, 1934, Serial No. 717,932

4 Claims. (Cl. 181—0.5)

My invention relates to a method of making geological explorations, and more particularly to a method whereby geological explorations are carried out by generating vibrations in the earth's surface in such a manner as to eliminate many undesirable vibrations near the origin thereof, and particularly in the vicinity of the earth's surface.

One method of making geological explorations consists in generating earth vibrations by detonating an explosive at or near the earth's surface. Vibrations or wave trains of motion are set up in the surface of the earth passing in all directions from the center of the disturbance. Part of the vibrations travels into the earth; another portion of the vibrations is reflected or refracted whenever vibrations pass from one medium into another medium having different physical characteristics. The reflected or echoed portion of the vibrations travels back to the surface of the earth where suitable seisphones are stationed which are adapted to translate the vibrations into recordable vibrations by electrical or combined electrical and photographic means.

A large part of the vibrations caused by the explosion passes directly to the surface layer of the earth and causes vibrations of large amplitude near the origin of the blast for appreciable periods of time. These vibrations are troublesome. Because of their amplitude they tend to camouflage or mask the reflected or echoed vibrations from the various tectonic formations and subsurface strata. In many localities because of the physical character of the surface layers satisfactory exploration of the deep lying geological strata cannot be carried out by means of earth vibrations.

One object of my invention is to provide a method of making geological explorations by means of generating earth vibrations in which trailer waves in the near surface layers are minimized.

Another object of my invention is to provide a method of geological exploration in which the total impact in the near surface layers is reduced while permitting a maximum amount of energy to be delivered to the deeper geological strata.

Further and other objects of my invention will appear from the following description.

In the accompanying drawings which form part of the instant specification, and which are to be read in conjunction therewith, Fig. 1 is a diagrammatic view of a section through the earth's surface showing the paths of a number of vibrations at a given instant.

Figure 2 is a diagrammatic view showing the waves generated by the several charges in Fig. 1 as would be received by a seisphone positioned at point Q in Fig. 1.

Fig. 3 is the resultant curve of the sine curves in Fig. 2 showing the resultant of the impulses which would be received by a seisphone at point Q in Fig. 1.

Figure 4:
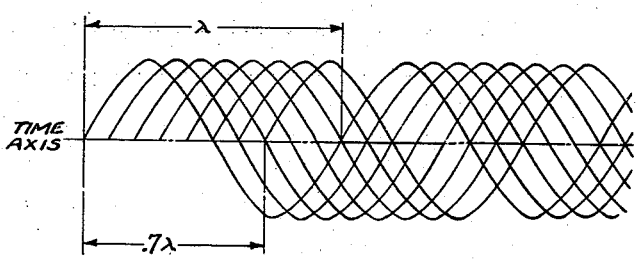
Fig. 4 is a diagrammatic view showing wave motions of longer wave lengths than those shown in Fig. 2.

In general, my invention provides a method of generating earth vibrations in which the total amount of explosive is divided up into a plurality of independent parts suitably spaced from each other. The uppermost portion of the explosive is first detonated and the succeeding portions are detonated in succession in a progressive manner. The arrangement is such, as will be more fully explained hereinafter, that a large part of the vibrations is eliminated at the surface of the earth, while that portion of the earth below the line of explosive units receives a large impact fully the equivalent of that which it would have received if the total amount of explosive were detonated simultaneously. In this manner the reflected or echoed vibrations can be received and recorded at the surface of the earth by suitable means without the camouflaging or masking effect which is had by the methods of the prior art.

Referring now to the drawings, in the earth's surface 50 is bored a hole 51 having a depth D, as indicated in Fig. 1. Within the hole 51 are placed a number of explosive charges 1, 2, 3, 4, 5, 6, 7, 8, 9 and 10. The charges may be placed at varying distances from each other. Usually the intercharge distance is equal. The only limitation with respect to the distances the charges are to be spaced from each other is that no charge shall be at a greater distance from its adjacent charge than that at which the effect of sympathetic detonation is effective, that is to say, the space between two adjacent charges shall not be greater than the distance at which the detonation of an adjacent explosive unit will yield sufficient shock to detonate an adjacent unit after the elastic wave given by a unit travels to its adjacent unit. The reason for this will be apparent from the mode of operation, which is as follows. When the uppermost charge 1 is detonated the vibration wave or explosive impact will travel out from charge 1 in all directions. As this impact strikes charge 2, it will cause charge 2 to detonate and the detonation of charge 2 will travel out in all directions. That part of the second impact which travels directly downward will add to the first impact from unit 1 and the combined resulting impact travels downwardly to detonate unit 3. The action progresses downwardly from one explosive unit to the next until all of the units are detonated.

By referring to Fig. 1, it will be observed that there is shown on the figure a plurality of curves 1', 2', 3', 4', 5', 6', 7', 8', 9', and 10'. These curves represent the paths of the impacts at a given instant. It is to be remembered, of course that the wave front travels substantially along the surface of a sphere. Inasmuch as Fig. 1 is a sectional view, the curves 1', 2', etc., appear as portions of a circle. It will also be observed that there is a point P at which all of the impacts are united, so that the result is equivalent of a single large impact passing downwardly to the geological strata below. At another point, as for example Q, it will also be observed that all of the impacts from the separate explosive units will arrive at different times. The wave motion at Q from explosive unit 1 is represented in Fig. 2 by curve 1". The wave motion at point Q from explosive unit 2 is represented in Fig. 2 being curve 2". Similarly the wave motions of respective explosive units 3, 4, 5, 6, 7, 8, 9 and 10 at point Q are represented in Fig. 2 by curves 3", 4", 5", 6", 7", 8", 9" and 10".

Fig 3 shows the resulting vibration at point Q of the separate vibrations given out by the several explosions. It will be observed that the resulting vibration consists of a single impact with no trailer wave motions following, the trailer wave motions having been neutralized by interference. It will be further obvious by reference to Figs. 2 and 3 that the troublesome trailer vibrations will be substantially eliminated by my method of progressive firing for all those frequencies of which the time duration of one wave length is equal to or less than the time interval for the passing of the impacts from explosive units 1 to 10. For example, if the elapsed time at the point Q from the first impact to the last impact were .1 second then the frequency having a wave length equal to .1 second, that is a wave motion of 10 cycles per second, and all frequencies higher would have substantial elimination of trailer wave motions in the manner shown by Fig. 3.

Figure 5:
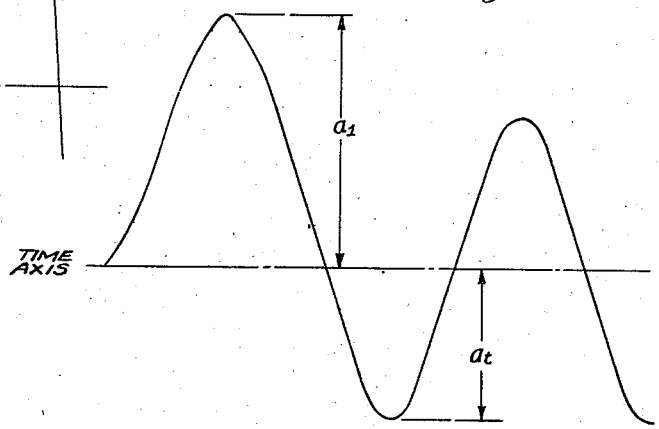
Fig. 5 is the resultant curve of the wave motions in Fig. 4.

Referring now to Fig. 4, I have taken, for purpose of illustration only, 7 explosive charges. The number of explosive charges is not critical as long as there are sufficient to give the desired smooth curve. In Fig. 4 it will be observed that the time elapsing from the first charge to the last charge is less than the wave length of the wave motions. By way of example, I have taken an elapsed time of firing which is .7 of the time of duration of one wave length. The resultant curve of the wave motions in Fig. 4 appears in Fig. 5. It will be observed that the amplitude $a_i$ of the first impact is larger than the $a_t$ of the trailer wave. It will be apparent that though the trailer waves have been reduced in amplitude they have not been fully eliminated. For practical purposes any reduction in the amplitude of the trailer waves is of benefit. It will be also apparent from the foregoing that there is a partial elimination of the trailer waves for all those frequencies of which the time duration of ½ wave length is equal to or less than the time elapsing from the first impact of the explosive string to the last impact of the explosive string.

Figure 6:
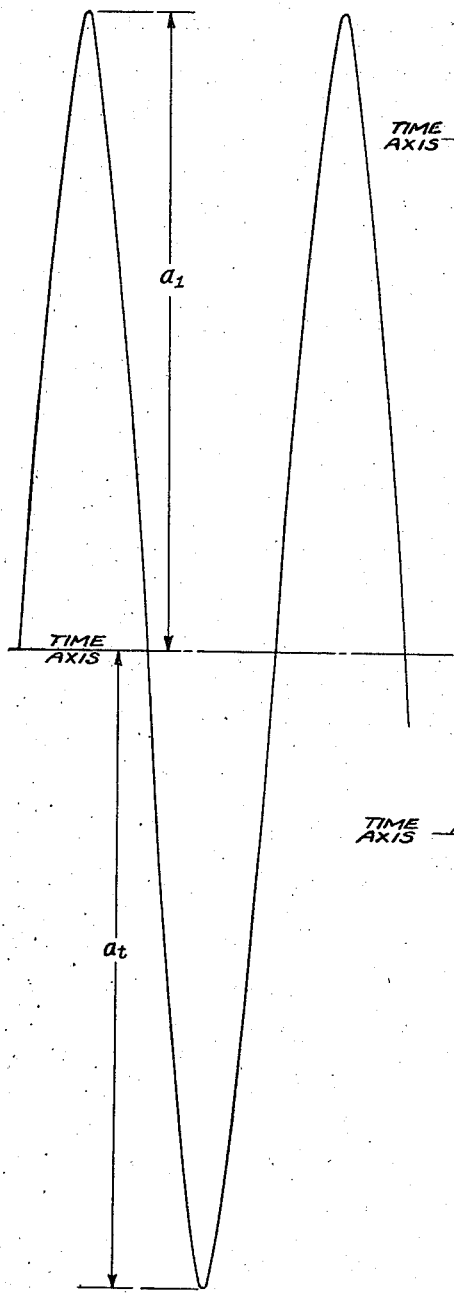
Fig. 6 is a curve showing the wave motion which would occur if the amount of explosive detonated in accordance with the method of my invention were exploded according to the practice of the prior art.

By referring to Fig. 6 in which the same amount of explosive was used as that in obtaining the curves in Fig. 4, except detonated simultaneously, it will be observed that the amplitude $a_t$ of the trailer waves is substantially equal to the amplitude $a_i$ of the first impact. Also it is to be observed that the $a_i$ of the first impact of Fig. 5 employing the principle of progressive detonation is definitely less than the first impact $a_i$ of Fig. 6 in which simultaneous detonation was used as in the prior art. This is also very important in reducing undesirable surface vibration.

In the drawings the showing is theoretical in that it is assumed the wave fronts will travel in perfect spheres and that the resistance to travel is small. In actual practice the resistance to travel, of course, naturally reduces the amplitude of the trailer waves. The instant showing, however, will clearly illustrate the principle.

Referring again to Fig. 1 it will be observed that a number of 30° zones have been drawn, the zones of 30° on each side of the hole being labeled zone 1; the next zones being zones 2, and the next zones being zones 3, etc. The two zones directly beneath the hole and comprising an arc of 60° are designated as zone 6. It will be obvious that in zone 6 there will be very little elimination of trailer waves. This is what I desire inasmuch as I seek to get a maximum impact traveling downwardly.

In the following table $F_e$ represents the frequency above which elimination of trailer waves is fully effective. $F_p$ represents the frequency above which elimination of trailer waves is partially effective. The term $t_p$ represents the elapsed time of progressive firing from the first to the last shot:

| Zone | $F_e$ | $F_p$ |
|---|---|---|
| 1 | $.5/t_p$ | $.25/t_p$ |
| 2 | $.66/t_p$ | $.33/t_p$ |
| 3 | $1.0/t_p$ | $.5/t_p$ |
| 4 | $2.2/t_p$ | $1.1/t_p$ |
| 5 | $6.4/t_p$ | $3.2/t_p$ |

In an actual shot in which the depth of the hole was 100 feet and the time $t_p$ required for the progressive detonation of the explosive units 1 to 10 was .025 second, the following table will illustrate the various frequencies showing the limitation of fully effective elimination and partially effective elimination in the various zones. Frequencies are given in cycles per second:

| Zone | $F_e$ | $F_p$ |
|---|---|---|
| 1 | 20 | 10 |
| 2 | 26 | 13 |
| 3 | 40 | 20 |
| 4 | 88 | 44 |
| 5 | 256 | 128 |

While I have pointed out above that I prefer to space the explosive units at distances no greater than that at which sympathetic detonation may be effected, my method could be used equally well with explosives which would not detonate progressively, or with the explosive charges placed at greater distances than those at which sympathetic detonation would take place. This could be done by placing electric blasting caps in each unit and connecting the respective lead wires to a suitable electric firing device which would space the intervals of detonation according to the needs of the geological locus being explored.

In actual practice I have been able to conduct geological explorations in terrains where ordinary methods would have been useless, namely, at a point having sand and river fill on the surface.

It will be understood that I have accomplished the objects of my invention. I am enabled to conduct geological explorations and eliminate troublesome trailer vibrations at or near the earth's surface, and to reduce the amplitude of the primary impacts at or near the earth's surface. In this manner I am able to obtain accurate records which are not camouflaged by troublesome trailer vibrations. By tuning the receiving instruments to those frequencies whose trailer waves are eliminated, I am enabled to obtain an unusually clear record from which satisfactory results may be obtained.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of making geophysical explorations including the step of exploding a substantially vertical series of spaced explosive charges in succession.

2. In a method of making geophysical explorations in which an explosive is employed to create earth vibrations, and reflections of said vibrations are received at or near the earth's surface, detonating a vertical series of spaced explosive charges in succession from the top downwardly, whereby trailer wave from the detonating charges is reduced in amplitude when received at or near the earth's surface.

3. In the art of creating earth vibrations for geological explorations, detonating a series of vertically spaced explosive charges in succession for a time interval of at least that of the time of duration of one-half cycle of a wave motion of the desired frequency, whereby the amplitude of the trailer wave of the impact from the several detonations is reduced when received at or near the earth's surface.

4. A method of making geophysical explorations including substantially vertically positioning a plurality of charges of explosives spaced from each other at intervals sufficiently close so that the explosion of a charge will detonate an adjacent charge by sympathy, detonating the uppermost charge, permitting the remaining charges to be sympathetically detonated in succession, and employing a sufficient number of charges so that successive explosions will occur during an interval of at least the time of duration of one-half cycle of a wave motion of the desired frequency, whereby the amplitude of the trailer wave of the impact of the resultant of the several detonations is reduced when received at or near the earth's surface.

HAROLD R. PRESCOTT.